United States Patent [19]  
Mueller-Tamm et al.

[11] 4,154,699  
[45] May 15, 1979

[54] MANUFACTURE OF A TITANIUM-CONTAINING COMPONENT FOR CATALYSTS OF THE ZIEGLER-NATTA TYPE

[75] Inventors: Heinz Mueller-Tamm, Ludwigshafen; Hans Schick, Mannheim; James F. R. Jaggard, Ludwigshafen; Johann Nickl, Bad Duerkheim, all of Fed. Rep. of Germany

[73] Assignee: BASF Aktiengesellschaft, Fed. Rep. of Germany

[21] Appl. No.: 855,875

[22] Filed: Nov. 30, 1977

[30] Foreign Application Priority Data

Dec. 24, 1976 [DE] Fed. Rep. of Germany ....... 2658939

[51] Int. Cl.$^2$ .................................................. C08F 4/64
[52] U.S. Cl. .............................. 252/429 B; 252/429 A; 526/142; 526/159
[58] Field of Search ..................... 252/429 B, 429 A

[56] References Cited

U.S. PATENT DOCUMENTS

| | | | |
|---|---|---|---|
| 3,032,510 | 5/1962 | Tornquist et al. | 252/429 A |
| 3,280,093 | 10/1966 | Coover et al. | 252/429 B X |
| 3,492,281 | 1/1970 | Smith et al. | 252/429 B X |
| 3,850,899 | 11/1974 | Wada et al. | 252/429 B X |
| 4,064,069 | 12/1977 | Veno et al. | 252/429 B |

*Primary Examiner*—Patrick Garvin  
*Attorney, Agent, or Firm*—Keil & Witherspoon

[57] ABSTRACT

A process for the manufacture of a titanium-containing component of a catalyst for the polymerization of monoolefins by the Ziegler-Natta method by milling (a) a particular titanium-containing compound, viz. a titanium trichloride/aluminum trichloride complex and (b) a particular ester with one another, in which process (1) a vibratory ball mill producing a particular milling acceleration is used, (2) the mill is first charged with the titanium-containing compound (a) and may or may not then be run for some time in the absence of diluents, (3) while milling, the ester (b) is added at a particular rate, continuously or in small portions, and in the absence of diluents, thereafter (4) the grist is brought to an elevated temperature, while milling, and is kept at this temperature until from 5 to 85% of the aluminum trichloride originally present in a bonded form in the titanium-containing compound (a) have been eliminated from the said compound (a), after which (5) if appropriate, the product obtained in accordance with (4) is washed with a hydrocarbon and dried, and then (6) the product obtained in accordance with (4) or in accordance with (5) is milled for a certain length of time at a low temperature in the absence of a diluent. Polyolefins of high stereoregularity can be obtained in a high specific yield by means of the catalyst component manufactured according to the invention.

10 Claims, No Drawings

MANUFACTURE OF A TITANIUM-CONTAINING COMPONENT FOR CATALYSTS OF THE ZIEGLER-NATTA TYPE

The present invention relates to a process for the manufacture of a titanium-containing component of a catalyst for the homopolymerization and copolymerization of α-monoolefins of 3 to 6 carbon atoms by the Ziegler-Natta method, in which (a) a titanium-containing compound of the general formula $$TiCl_3 \cdot nAlCl_3$$

where n is a number from 0.01 to 1 and (b) an ester of a total of from 2 to 34 carbon atoms, which has the general formula $$R^1-O-CO-R^2 \text{ or } R^1-O-CO-\underset{R^2}{\underset{|}{C}}=\underset{R^2}{\underset{|}{CH}}$$

where $R^1$ is (I) alkyl of 1 to 16 carbon atoms or (II) phenylalkyl of a total of 7 to 23 carbon atoms, up to 5 hydrogen atoms of the phenyl radical being unsubstituted or substituted by alkyl of 1 to 5 carbon atoms, and $R^2$ is (I) hydrogen, (II) alkyl of 1 to 18 carbon atoms, (III) phenylalkyl of a total of 7 to 23 carbon atoms, up to 5 hydrogen atoms of the phenyl radical being unsubstituted or substituted by alkyl of 1 to 5 carbon atoms, (IV) phenyl or (V) alkylphenyl of a total of 7 to 23 carbon atoms, up to 5 hydrogen atoms of the phenyl radical being unsubstituted or substituted by alkyl of 1 to 5 carbon atoms, individual radicals $R^2$ being identical or different when more than one is present, are milled with one another.

A plurality of processes of this type have been disclosed; in the main, the object of these processes is to obtain titanium-containing components which, after activation with an organo-aluminum compound or the like—give catalysts which, when used for polymerizing α-olefins, give high specific yields of poly-α-olefins and/or give poly-α-olefins with a relatively high proportion of stereoregular polymer.

The conventional processes have achieved substantial success. However, it is a certain disadvantage that the titanium-containing components, when used in catalysts of the Ziegler-Natta type which are employed for the polymerization of α-olefins, either give polymers which have a relatively high stereoregularity (isotacticity give only relatively low specific yields of the polymers, or vice versa.

It is an object of the present invention to provide a process of the type defined at the outset by means of which it is possible to obtain titanium-containing components which are free from the above disadvantage, or suffer from it to a substantially reduced degree.

We have found that this object is achieved by working under particular physical milling conditions, bringing the starting materials together in a specific manner, milling them with one another until a particular critical range is reached, and after-treating the resulting intermediate of the desired titanium-containing component in a specific manner.

Accordingly, the present invention relates to a process for the manufacture of a titanium-containing component of a catalyst for the homopolymerization and copolymerization of α-monoolefins of 3 to 6 carbon atoms by the Ziegler-Natta method, by milling together (a) a titanium-containing compound of the general formula $$TiCl_3 \cdot nAlCl_3$$

where n is a number from 0.01 to 1, especially from 0.1 to 0.4, and (b) an ester of a total of 2 to 34, especially 2 to 18, carbon atoms, which has the general formula $$R^1-O-CO-R^2 \text{ or } R^1-O-CO-\underset{R^2}{\underset{|}{C}}=\underset{R^2}{\underset{|}{CH}}$$

where $R^1$ is (I) alkyl of 1 to 16, especially of 1 to 8, carbon atoms or (II) phenylalkyl of a total of 7 to 23, especially of 7 to 14, carbon atoms, up to 5 hydrogen atoms of the phenyl radical being unsubstituted or substituted by alkyl of 1 to 5 carbon atoms, and $R^2$ is (I) hydrogen, (II) alkyl of 1 to 18, especially of 2 to 12, carbon atoms, (III) phenylalkyl of a total of 7 to 23, especially of 7 to 14, carbon atoms, up to 5 hydrogen atoms of the phenyl radical being unsubstituted or substituted by alkyl of 1 to 5 carbon atoms, (IV) phenyl or (V) alkylphenyl of a total of 7 to 23, especially of 7 to 14, carbon atoms, up to 5 hydrogen atoms of the phenyl radical being unsubstituted or substituted by alkyl of 1 to 5 carbon atoms, individual radicals $R^2$ being identical or different when more than one is present, wherein (1) a vibratory ball mill producing a milling acceleration of from 30 to 80, especially from 45 to 55, m.sec.$^{-2}$ is employed, (2) the mill is first charged with the titanium-containing compound (a), after which it may or may not be operated in the absence of a diluent at from −50° to +100° C., especially from −30° to +50° C., over a period of from 0.5 to 100 hours, especially from 2 to 20 hours, then (3) whilst milling at a grist temperature of from −50° to +80° C., especially from −30° to +60° C., an amount of the ester (b) which corresponds to a molar ratio of aluminum in the titanium-containing compound (a) to ester (b) of from 1:15 to 1:0.05, especially from 1:2 to 1:0.7, is added continuously or at intervals, in the absence of a diluent, at a rate of from 0.01 to 200, especially from 10 to 80, ml/min per 2.5 kg of titanium-containing compound (a), thereafter (4) whilst being milled, the grist is brought to from +10° to +100° C., especially from +20° to +60° C., and is kept in this temperature range until from 5 to 85%, especially from 10 to 70%, of the aluminum trichloride originally present in a bonded form in the titanium-containing compound (a) has been eliminated from the latter, after which (5) is desired, the product obtained in accordance with (4) is washed with at least 0.6 times its amount by weight of a hydrocarbon which is liquid at standard temperature and pressure and boils below 150° C., especially below 100° C., at standard pressure and is dried, and then (6) the product obtained in accordance with (4) or (4) and (5) is milled, in the absence of diluents, for a period of from 5 to 60 minutes, especially from 10 to 30 minutes, at from −50° to −10° C., especially from −40° to −20° C.

The following should be noted with respect to the materials used in the new process.

The titanium-containing compounds (a) having the stated general formula are the relevant conventional compounds, for example those obtainable by co-crystallization TiCl$_3$ and AlCl$_3$ or reducing TiCl$_4$ by means of aluminum or mixtures of aluminum and titanium. Co-crystallized products of the formula TiCl$_3 \cdot \frac{1}{3}$AlCl$_3$ are particularly suitable. The appropriate titanium-containing compounds (a) are commercially available, so that more detailed comments are superfluous.

Suitable esters (b) having the stated general formula are again the relevant conventional compounds conforming to this formula, especially those where $R^1$ is methyl, ethyl, propyl, n-butyl, n-pentyl, i-pentyl, n-hexyl or benzyl and $R^2$ is hydrogen or methyl, ethyl, n-propyl, n-butyl, n-pentyl, i-pentyl, n-hexyl, n-heptyl, n-octyl, phenyl, benzyl, 1-phenylethyl, 2-phenylethyl, 3-phenylpropyl, 4-phenylbutyl or 5-phenylpentyl.

Specific examples of very suitable esters (b) are ethyl acetate, butyl acetate, ethyl n-butyrate and butyl acrylate.

Other particularly suitable esters (b) are ethyl propionate, ethyl n-valerate, ethyl phenylacetate, ethyl 3-phenylpropionate, ethyl 4-phenylbutyrate and butyl methacrylate.

The liquid hydrocarbon to be used on step (5) can be a hydrocarbon of the type which is conventionally brought into contact with titanium-containing components for catalysts of the Ziegler-Natta type, without detriment to the catalyst or to its titanium-containing component, for example in the polymerization of α-monoolefins. Examples of suitable hydrocarbons are pentanes, hexanes, heptanes, gasolines and cyclohexane.

The process according to the invention is very simple to carry out and does not require any explanation to those skilled in the art. At most, what requires mention is that the degree of partial elimination of the aluminum chloride from the titanium-containing compound (a), which degree is critical in step (4) can easily be ascertained by taking a sample of the grist periodically, washing it—for example with the hydrocarbon to be used in step (5)—and drying it and analyzing the resulting solid. Step (5) will expediently be carried out if, for example, the grist from step (4) is sticky or contains relatively large amounts of ester (b).

The titanium-containing components for catalysts of the Ziegler-Natta type, manufactured by the process of the invention, can be employed in the relevant conventional manner in the polymerization of α-olefins, i.e. these titanium components are in general used together with an organo-metallic activator, especially with an aluminum-alkyl compound of the formula Al(alkyl)$_3$ or ClAl(alkyl)$_2$, where alkyl is of one to eight carbon atoms, and above all together with triethylaluminum or diethyl-aluminum chloride.

Particularly good results are obtained in the dry polymerization of α-olefins, i.e. the polymerization in the absence of liquid auxiliary media; however, polymerization in the presence of such media can also be carried out with good success. The molecular weight can be adjusted by means of the conventional regulators, especially hydrogen. Suitable α-olefins to polymerize are those of three of six carbon atoms, especially propylene, 1-butene and 4-methyl-1-pentene.

EXAMPLE 1

Manufacture of the titanium-containing component

The starting compounds are (a) a titanium compound of the formula TiCl$_3 \cdot \frac{1}{3}$AlCl$_3$ and (b) ethyl n-valerate.

Milling is carried out in a vibratory ball mill having a useful volume of 10 liters.

In other respects the procedure followed is that:

(1) the mill is operated with a milling acceleration of 53 m.sec$^{-2}$, (2) the mill is initially charged with 2.4 kg of the titanium-containing compound (a) and is operated in the absence of diluents at 15° C. for a period of 14 hours, then (3) whilst milling at a grist temperature of −24° C., the amount of the ester (b) which corresponds to a molar ratio of aluminum in the titanium-containing compound (a) to ester (b) of 1:1 is added continuously at a rate of 48 ml/min per 2.5 kg of titanium-containing compound (a), in the absence of diluents, thereafter (4) whilst milling, the grist is brought to 40° C. and is kept near this temperature until 24% of the aluminum trichloride originally present in a bonded form in the titanium-containing compound (a) has been eliminated from the said compound, after which (5) the product obtained in accordance with (4) is washed with 5.3 times its amount by weight of hexane and dried under argon and then (6) the product obtained in accordance with (5) is milled for a period of 10 minutes at −30° C. in the absence of diluents.

Polymerization by means of the titanium-containing component 1.0 gram of the titanium-containing component and 1.98 grams of diethyl-aluminum chloride are introduced into a 2 liter stirred flask which is charged with 1.5 liters of dry heptane. The polymerization is then carried out for a period of 5 hours whilst stirring, under a propylene pressure of 1 bar at 60° C., the pressure and temperature being regulated to keep them constant; thereafter the polymerization is stopped by adding 20 ml of methanol and the suspension medium is removed by distillation.

192 g of polypropylene are obtained, corresponding to a productivity of 273 parts by weight of polypropylene per part by weight of titanium-containing compound (a), calculated as TiCl$_3$. The polypropylene contains 1.5 percent by weight of material soluble in boiling n-heptane.

EXAMPLE 2

Manufacture of the titanium-containing component

The starting compounds are (a) a titanium compound of the formula TiCl$_3 \cdot \frac{1}{3}$AlCl$_3$ (commercial finely milled material) and (b) butyl methacrylate.

Milling is carried out in a vibratory mill having a useful volume of 10 liters.

In other respects the procedure followed is that:

(1) the mill is operated with a milling acceleration of 50 m.sec$^{-2}$, (2) the mill is initially charged with 2.4 kg of the titanium-containing compound (a), then (3) whilst milling at a grist temperature of −26° C., the amount of the ester (b) which corresponds to a molar ratio of aluminum in the titanium-containing compound (a) to ester (b) of 1:1 is added in discrete portions at a rate of 58 ml/min per 2.5 kg of titanium-containing compound (a), in the absence of diluents, thereafter (4) whilst milling, the grist is brought to 40° C. and is kept near this temperature until 12% of the aluminum trichloride originally present in a bonded form in the titanium-containing compound (a) has been eliminated from the said compound, after which (5) the product obtained in accordance with (4) is washed with 5.5 times its amount by weight of n-hexane and dried and then (6) the product obtained in accordance with (5) is milled for a period of 12 minutes at −30° C. in the absence of diluents.

Polymerization by means of the titanium-containing component

The process is carried out using a stirred reactor of 0.8 m³ capacity, under a propylene pressure of 28 bars, which is maintained continuously by a regulating system, and using an amount of hydrogen of 90 liters (S.I.P.)/h, at a reaction temperature of 70° C., regulated continuously to keep it constant, and in the absence of solvents and diluents, in a bed of 280 kg of small particles of propylene polymer. The reactor is operated continuously, with 12 g/h of the titanium-containing component and 42 g/h of $(C_2H_5)_2AlCl$ being introduced separately from one another.

The reactor produces polypropylene in the form of small particles, of average size about 0.2 mm; this product contains 32 ppm, by weight, of titanium and 4.4% by weight of material soluble in boiling n-heptane, and has an intrinsic viscosity of 2.8 dl/g.

EXAMPLE 3

Manufacture of the titanium-containing component

The starting compounds are (a) a titanium compound of the formula $TiCl_3 \cdot \frac{1}{3}AlCl_3$ and (b) ethyl 4-phenylbutyrate Milling is carried out in a vibratory ball mill having a useful volume of 10 liters.

In other respects the procedure followed is that:

(1) the mill is operated with a milling acceleration of 53 m.sec⁻², (2) the mill is initially charged with 2.4 kg of the titanium-containing compound (a) and is operated in the absence of diluents at 15° C. for a period of 15 hours, then (3) whilst milling at a grist temperature of −26° C., the amount of the ester (b) which corresponds to a molar ratio of aluminum in the titanium-containing compound (a) to ester (b) of 1:1 is added continuously at a rate of 58 ml/min per 2.5 kg of titanium-containing compound (a), in the absence of diluents, thereafter (4) whilst milling, the grist is brought to 40° C. and is kept near this temperature until 12% of the aluminum trichloride originally present in a bonded form in the titanium-containing compound (a) has been eliminated from the said compound, after which (5) the product obtained in accordance with (4) is washed with 5.2 times its amount by weight of hexane and dried under argon and then (6) the product obtained in accordance with (5) is milled for a period of 12 minutes at −30° C. in the absence of diluents.

Polymerization by means of the titanium-containing component 1.0 gram of the titanium-containing component and 1.67 grams of diethyl-aluminum chloride are introduced into a 2 liter stirred flask which is charged with 1.5 liters of dry heptane. The polymerization is then carried out for a period of 5 hours whilst stirring, under a propylene pressure of 1 bar at 60° C., the pressure and temperature being regulated to keep them constant; thereafter the polymerization is stopped by adding 20 ml of methanol and the suspension medium is removed by distillation.

159 g of polypropylene are obtained, corresponding to a productivity of 268 parts by weight of polypropylene per part by weight of titanium-containing compound (a), calculated as $TiCl_3$. The polypropylene contains 1.6 percent by weight of material soluble in boiling n-heptane.

We claim:

1. A process for the manufacture of a titanium-containing component of a catalyst for the homopolymerization and copolymerization of α-monoolefins of 3 to 6 carbon atoms by the Ziegler-Natta method, by milling together (a) a titanium-containing compound of the general formula $$TiCl_3 \cdot nAlCl_3$$

where n is a number from 0.01 to 1, and (b) an ester of a total of 2 to 34 carbon atoms, which has the general formula $$R^1-O-CO-R^2 \text{ or } R^1-O-CO-C=CH$$
$$\qquad\qquad\qquad\qquad\qquad\qquad | \quad |$$
$$\qquad\qquad\qquad\qquad\qquad\qquad R^2 \quad R^2$$

where $R^1$ is (I) alkyl of 1 to 16 carbon atoms or (II) phenylalkyl of a total of 7 to 23 carbon atoms, up to 5 hydrogen atoms of the phenyl radical being unsubstituted or substituted by alkyl of 1 to 5 carbon atoms, and $R^2$ is (I) hydrogen, (II) alkyl of 1 to 18 carbon atoms, (III) phenylalkyl of a total of 7 to 23 carbon atoms, up to 5 hydrogen atoms of the phenyl radical being unsubstituted or substituted by alkyl of 1 to 5 carbon atoms, (IV) phenyl or (V) alkylphenyl of a total of 7 to 23 carbon atoms, up to 5 hydrogen atoms of the phenyl radical being unsubstituted or substituted by alkyl of 1 to 5 carbon atoms, individual radicals $R^2$ being identical or different when more than one is present, wherein (1) a vibratory ball mill producing a milling acceleration of from 30 to 80 m.sec.⁻² is employed, (2) the mill is first charged with the titanium-containing compound (a), after which it may or may not be operated in the absence of a diluent at from −50 to +100° C. over a period of from 50° to 100 hours, then (3) whilst milling at a grist temperature of from −50° to +80° C. an amount of the ester (b) which corresponds to a molar ratio of aluminum in the titanium-containing compound (a) to ester (b) of from 1:5 to 1:0.5 is added continuously or at intervals, in the absence of a diluent, at a rate of from 0.01 to 200 ml/min per 2.5 kg of titanium-containing compound (a), thereafter (4) whilst being milled, the grist is brought to from +10° to +100° C. and is kept in this temperature range until from 5 to 85% of the aluminum trichloride originally present in a bonded form in the titanium-containing compound (a) has been eliminated from the latter, after which (5) is desired, the product obtained in accordance with (4) is washed with at least 0.6 times its amount by weight of a hydrocarbon which is liquid at standard temperature and pressure and boils below 150° C. at standard pressure and is dried, and then (6) the product obtained in accordance with (4) or (4) and (5) is milled, in the absence of diluents, for a period of from 5 to 60 minutes at from −50° to −10° C.

2. A process as claimed in claim 1, wherein a vibratory ball mill providing a milling acceleration of 45 to 55 m.sec$^{-2}$ is employed.

3. A process as claimed in claim 1, wherein the vibratory ball mill is operated in the absence of a diluent at from −30° to +50° C., over a period of from 2 to 20 hours in step (2).

4. A process as claimed in claim 1, wherein, whilst milling at a grist temperature of from −30° to +60° C., an amount of the ester (b) which corresponds to a molar ratio of aluminum in the titanium-containing compound (a) to ester (b) of from 1:2 to 1:0.7 is added at a rate of from 10 to 80 ml/min per 2.5 g of titanium-containing compound (a) in step (3).

5. A process as claimed in claim 1, wherein, whilst being milled in step (4), the grist is brought to from +20° to +60° C. and is kept in this temperature range until from 10 to 70% of the aluminum trichloride originally present in a bonded form in the titanium-containing compound (a) has been eliminated from the latter.

6. A process as claimed in claim 1, wherein step (5) is performed and the liquid hydrocarbon used in step (5) boils below 100° C. at standard pressure.

7. A process as claimed in claim 1, wherein the product is milled in step (6) for a period of from 10 to 30 minutes at from −40° to −20° C.

8. A process as claimed in claim 1, wherein, for the titanium-containing compound (a), n is a number from 0.1 to 0.4.

9. A process as claimed in claim 1, wherein the ester (b) has the formula $$R^1-O-CO-R^2$$

where $R^1$ is alkyl of 1 to 8 carbon atoms or phenylalkyl of 7 to 14 carbon atoms and $R^2$ is hydrogen, alkyl of 1 to 12 carbon atoms, phenyl or alkylphenyl or phenylalkyl of a total of 7 to 14 carbon atoms, the ester containing a total of 2 to 18 carbon atoms.

10. A process as claimed in claim 1, wherein the ester (b) has the formula $$R^1-O-CO-\underset{R^2}{C}=\underset{R^2}{CH}$$

where $R^1$ has the meaning given in claim 9 and $R^2$ is hydrogen, alkyl of 1 to 12 carbon atoms, phenyl or phenylalkyl or alkylphenyl of a total of 1 to 14 carbon atoms, individual radicals $R^2$ being identical or different, the ester containing a total of 4 to 18 carbon atoms.

* * * * *